(12) United States Patent  
Milana

(10) Patent No.: US 7,853,526 B2  
(45) Date of Patent: Dec. 14, 2010

(54) DATA TRANSACTION PROFILE COMPRESSION

(75) Inventor: Joseph P. Milana, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 557 days.

(21) Appl. No.: 11/800,348

(22) Filed: May 4, 2007

(65) Prior Publication Data

US 2008/0275814 A1    Nov. 6, 2008

(51) Int. Cl.  
*G06Q 40/00* (2006.01)

(52) U.S. Cl. .............................. 705/41; 705/35; 705/38; 235/379

(58) Field of Classification Search ...................... 705/1, 705/38, 42, 35, 41  
See application file for complete search history.

(56) References Cited

U.S. PATENT DOCUMENTS 6,330,546 B1 * 12/2001  Gopinathan et al. ........... 705/35

2009/0018940 A1 * 1/2009  Wang et al. .................... 705/35

* cited by examiner

*Primary Examiner*—Ojo O Oyebisi  
(74) *Attorney, Agent, or Firm*—Mintz, Levin, Cohn, Ferris, Glovsky and Popeo, P.C.

(57) ABSTRACT

Techniques for compressing data transaction history profiles are disclosed. Such profiles can include a plurality of profile variables with each profile variable comprising a real number that provides a factor for determining whether a proposed data transaction is indicative of fraud. A bit string is generated for each profile variable in the profiles that characterizes a first value plus a second value. The first value is equal to a mantissa for the real number corresponding to the profile variable. The second value is equal to a number of orders of magnitude above a minimum required expressed as multiples of the number of orders magnitude required to represent the plurality of real numbers in each the plurality of transaction history profiles divided by a range of bits. The generated bit string is stored as compressed profile variable within the data transaction history profiles. Related systems, apparatus, methods, and/or articles are also described.

20 Claims, 2 Drawing Sheets

DATA TRANSACTION PROFILE COMPRESSION

TECHNICAL FIELD

The subject matter described herein relates to the compression of profiles used in identifying and characterizing data transactions such as electronic financial transactions.

BACKGROUND

Fraud is becoming an increasing problem as the number of financial transactions conducted electronically, whether online or via credit card terminals, increases. In order to rapidly identify transactions indicative of fraud, systems have been deployed that utilize complex models to provide real-time characterizations of requested transactions prior to their approval. Profiles can be generated for each account holder to provide additional information that can be used to minimize the number of false-positive fraud alerts. As those initiating fraudulent transactions become more sophisticated and adopt new measures to circumvent fraud detection systems, richer profiles are needed to counter such measures. However, most fraud detection systems incorporate a fixed profile size thereby preventing richer profiles without significant modifications or deployment of enhanced systems.

SUMMARY

In one aspect, data transaction history profiles are compressed. Such profiles can include a plurality of profile variables with each profile variable comprising a real number that provides a factor for determining whether a proposed data transaction is indicative of fraud or some other factor. A bit string is generated for each profile variable in the profiles that characterizes a first value plus a second value. The first value is equal to a mantissa for the real number corresponding to the profile variable. The second value is equal to a number of orders of magnitude above a minimum required expressed as multiples of the number of orders magnitude required to represent the plurality of real numbers in each the plurality of transaction history profiles divided by a range of bits. The generated bit string is stored as a compressed profile variable within the data transaction history profiles. Optionally, the compressed profile variable can be decompressed when a data transaction associated with the data transaction history profile is initiated.

In addition, a sign of a mapped integer characterizing an overall sign of the real number in the profile variable may be determined. In such variations, the bit string characterizes the sign of the mapped integer.

The data transaction can be any type of transaction in which a data transaction history profile can be used to score some aspect of the transaction (e.g., fraud). As an example, the data transaction may be a financial transaction, such as a payment card (e.g., credit card, debit card, etc.) transaction. The data transaction history profile can characterize behavioral data of a cardholder and/or historical transaction data of a merchant accepting a plurality of payment cards.

In an interrelated aspect, data transaction history profiles are compressed by generating a bit string for each real number. Such a bit string includes a predefined number of bits for an exponent for the real number, a bit characterizing a sign of the exponent, at least one bit characterizing a sign of the real number, and a plurality of bits characterizing a reduced level of precision of the real number. The bit string can be stored as a compressed profile variable within the data transaction history profiles (for later use/decompression in connection with subsequent data transactions).

In still a further interrelated aspect, payment card transaction history profiles can be compressed by determining a mantissa for each profile variable in the profiles, the mantissa being rounded as units of a number equal to a number of orders of magnitude required to represent the plurality of real numbers in each of the plurality of transaction history profiles divided by a range of bits. In addition, an argument for an exponent for each real number and a sign of a mapped integer corresponding to each real number can be determined. The mapped signed integer can then be stored as a compressed profile variable within the data transaction history profiles for subsequent decompression in connection with a relevant data transaction.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
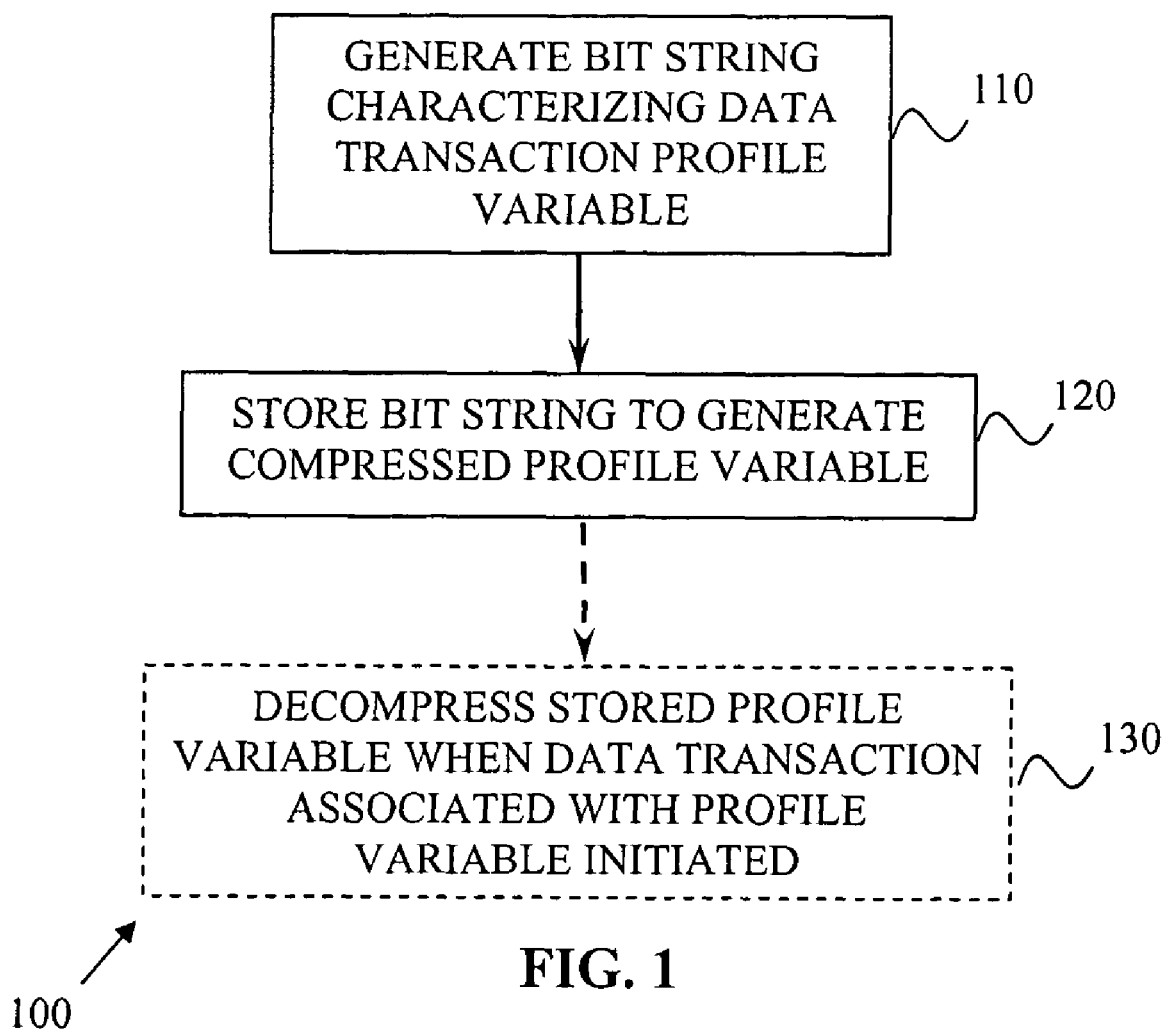
FIG. 1 is a process flow diagram illustrating a method of generating a compressed profile variable, storing the compressed profile variable within a data transaction history profile, and decompressing the profile variable in order to determine whether a data transaction associated with the history profile is indicative of fraud.

FIG. 1 is a process flow diagram illustrating a method 100, in which, at 110, a bit string comprising a compressed profile variable for a data transaction history profile is generated. Thereafter, at 120, the bit string is stored to generate a compressed history profile so that, optionally, at 130, the compressed history profile may be decompressed and accessed in order to determine whether a particular transaction is indicative of fraud. Various techniques for generating a compressed profile variable are described below.

Data transaction history profiles include summaries of a consumer's data transaction history. Such data transaction history profiles can be used by fraud prediction models to deliver high-speed, "just-in-time", data transaction (e.g., payments by credit or debit cards) fraud detection. These profiles represent highly manipulated mathematical summaries of a consumer's long and short-term behaviors specifically crafted for the purpose of detecting fraud. Example fraud detection models are described within U.S. Pat. No. 5,819, 226 to Gopinathan et al., entitled "Fraud Detection using Predictive Modeling", U.S. Pat. No. 6,330,546, to Gopinathan et al., entitled "Risk Determination and Management using Predictive Modeling and Transaction Profiles for Individual Transacting Entities", and U.S. patent Ser. No. 11/677,517, to Griegel et al., entitled "Method and Apparatus for a Merchant Profile Builder." (and the contents of all three references are hereby fully incorporated by reference).

Excluding book-keeping entries, profiles for existing models are composed of single-precision real numbers: each variable thus requiring four bytes of storage. The current techniques can compress each of these real numbers to two bytes without impact on model performance.

Falcon and FP models are neural network, statistical models trained using back-propagation. Such neural networks when applied to binary outcomes, as implemented by Fair Isaac in its Fraud Predictor product, have been shown (see, for example, M. Richard & R. Lippmann, "Neural Network Classifiers Estimate Bayesian a posteriori Probabilities", Neural Computation 3, 461-483 (1991)) to approximate the posterior probability of the binary (i.e., fraud), as reflected in the training set of exemplars. The Falcon score thus reflects the probability of fraud (as labeled with the Fair Isaac tagging process). The Falcon score that can be delivered ranges from 1 to 999. By the properties of a Poisson distribution, to achieve statistical significance of one in a thousand requires that the training set consist of one million exemplars for each returned score or 1 Billion exemplars in total. However, such training sets are well-beyond the capacity of conventional systems.

A more reasonable estimate of statistical accuracy is at the one percent level, (or binning the scores in buckets of ten): requiring ~10,000 exemplars per bucket or 1 million exemplars in total in the training set. Such statistical significance suggests that profile variables (that implicitly or explicitly feed the statistical model) are only required at a precision of one part or so in a thousand (i.e., within a factor of 10 of the expected statistical accuracy of the model). It is noted that there is the theoretical possibility that the model critically depends upon the cancellation between profile variables; however, such a dependence was judged could only arise accidentally (i.e., existing profile variables were not intentionally designed with such cancellations expected) and would likely result in unstable models, whereas Falcon has proven to be highly robust overtime. Therefore, fraud detection system using data transaction profiles allocating four bytes for each variable provide an unnecessarily high level of precision, and as a result, two bytes is the most natural scale required.

Expressing a real-number with precision of O $(10^{-3})$ within 2 bytes can be achieved a variety of ways. In one implementation, the profile variables in the data transaction history profiles can be generated through bit manipulation. Bit manipulation can comprise assigning a certain number of bits for the argument of the exponent; another bit to determine the sign of the exponent; one more bit to determine the overall sign of the number; leaving the remaining bits for numerical precision (enforced during the writing stage of the real-number to the profile through bit-truncation). Precision at one part in a thousand requires 10 bits, allowing the exponent to cover 32 orders of magnitude (from −16 to +16=$2^4$: more than adequate for fraud detection). Such bit-wise operations can fully utilize 16 bits but can be cumbersome to implement within conventional frameworks; potentially introduce operating-system dependencies (due to little-endian vs. big-endian issues); and not able to be extended if the needed range of the exponential did not fit within a power of two (possibly thus losing precision that might yet prove to be needed).

As an alternative to bit manipulation, the following algorithm based upon modular/clock type arithmetic can be used to compress (with loss) a real-number, R, into a two byte signed integer for storage as a profile variable:

Let M=the orders of magnitude needed to be represented: $e^{-M/2} \leq R \leq e^{+M/2}$.

Divide $2^{15}$~32,000 into M partitions: each partition will be used to represent an order of magnitude within the above range.

1) Determine m, the mantissa of R rounded as units of M/32000.
2) Determine e, the argument of the exponent of R.
3) The mapped signed integer=sign(R)*[(e+M/2)*32000/M+m].

The decompression algorithm for converting the two-byte profile value into the real number used for scoring a new transaction is the inverse function of the above mapping. Once decompressed into a real number, all manipulations for updating profile variables and subsequent use as input into the neural network proceeds as usual (so that in practice, the only new code needed in the model files involves the decompression of the profile, followed by compression of the updated profile values).

Below is a code-snippet of such manipulations for the Daily Dollar in One Day profile variable wherein M=16 and precision is at one part in two thousand:

```
// Original: UnCompressed Version of Variable
VAR DAILY_DOL_AUTH_1D_98S : FLOAT
GRP = VARS
MAP = PROF.P207
RCOD = 8
CALC =
DAILY_RATE(DAILY_DOL_AUTH_1D_98S,     IS_AUTH,
DOL_AMT,     A_DR_COEF1_1DAY_98S,
A_DR_COEF2_1DAY_98S);
// Compressed Version: first read-in and decompress value in profile
VAR s1DAILY_DOL_AUTH_1D_98S : FLOAT
GRP = VARS
CALC =
VAR
    TMP1 : NUMERIC;
    TMP, ATMP, TMPE, TMP2, TMPF, SIGN : INT16;
BEGIN
    TMP := PROF.P207;
    if(TMP < 0) THEN SIGN := −1; ELSE SIGN := 1;
    ATMP := ABS(TMP);
    TMPE := TRUNC(ATMP/2000)−8;
    TMP2 := (ATMP−(TMPE+8)*2000)*5;
    if(ATMP = 0) THEN TMP1 := 0;
    else    IF(TMPE = 8) THEN TMP1 := SIGN*100000000;
            ELSE TMP1 := SIGN*TMP2/1000.0*POWER(10,TMPE);
    RETURN(TMP1);
ENDVAR;
// Update resulting real number
VAR DAILY_DOL_AUTH_1D_98S : FLOAT
GRP = VARS
RCOD = 8
CALC =
DAILY_RATE(s1DAILY_DOL_AUTH_1D_98S,     IS_AUTH,
DOL_AMT,     A_DR_COEF1_1DAY_98S,
A_DR_COEF2_1DAY_98S);
// Compress and write out new profile value of variable.
VAR s2DAILY_DOL_AUTH_1D_98S : FLOAT
GRP = VARS
CALC =
VAR
    TMP, TMP1, ATMP : NUMERIC;
    TMPE, TMP2, TMPF, SIGN : INT16;
BEGIN
    TMP := DAILY_DOL_AUTH_1D_98S;
    ATMP := ABS(TMP);
    if(TMP < 0) THEN SIGN := −1; ELSE SIGN := 1;
    if(ATMP > 0) THEN TMP1 := LOG10(ATMP); ELSE TMP1 := 0;
    if(TMP1 < 0) THEN TMPE := TRUNC(TMP1)−1;
    ELSE TMPE := TRUNC(TMP1);
```

-continued

```
    TMP2 := ROUND(1000*ATMP/5*POWER(10,-TMPE));
    if(TMPE < -8 or ATMP = 0) THEN TMPF := 0;
    ELSE    if(TMPE >= 8) THEN TMPF := SIGN*32000;
            else TMPF := SIGN*((TMPE + 8)*2000+TMP2);
    PROF.P207 := TMPF;
RETURN(CON_1);
ENDVAR;
```

Figure 2:
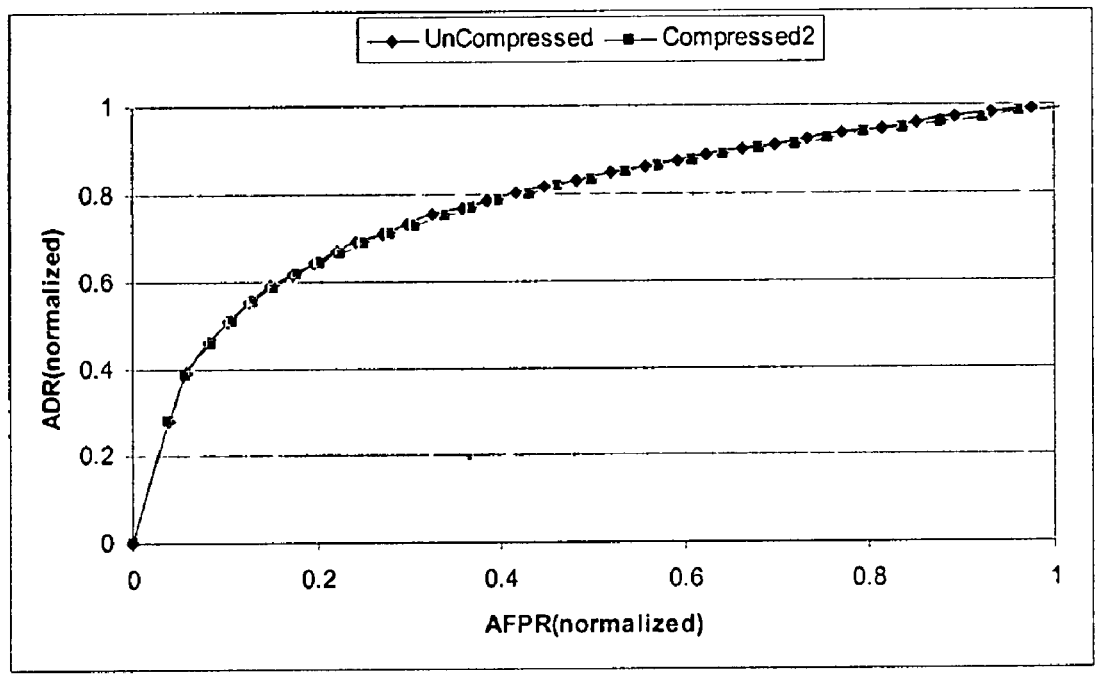
FIG. 2 is a chart illustrating a first comparison between a series of data transactions using uncompressed and compressed profile variables.
Figure 3:
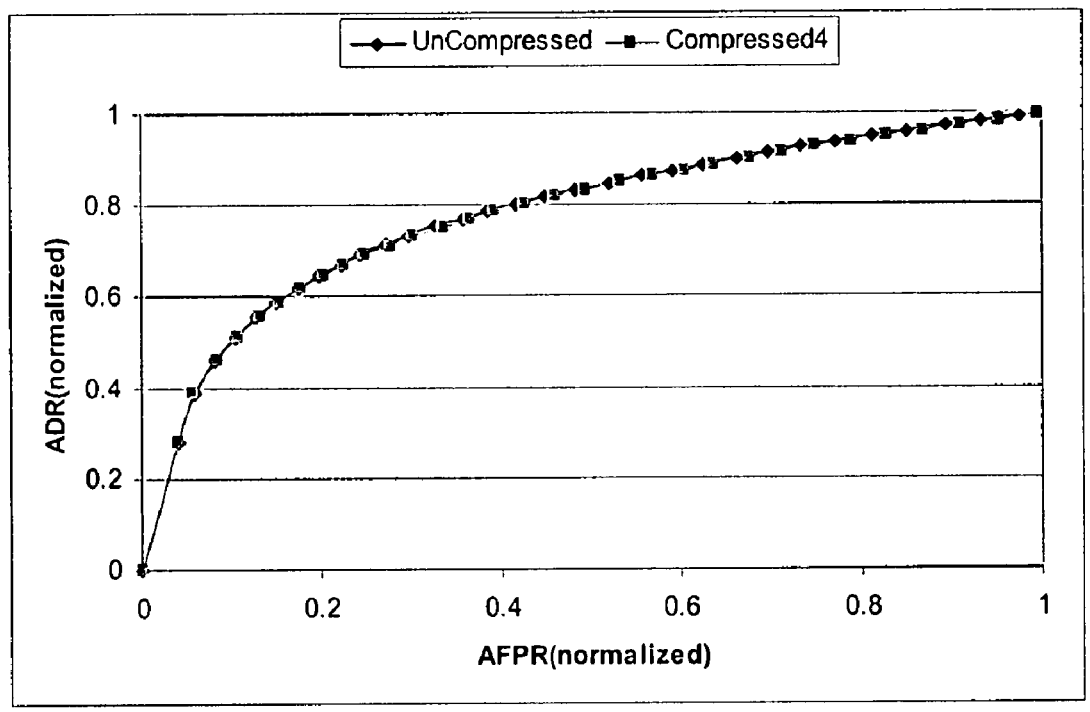
FIG. 3 is a chart illustrating a second comparison between a series of data transactions using uncompressed and compressed profile variables.

In one use case, the above compression scheme was applied to ALL non-book-keeping Cardholder profile variables in a Fraud Predictor model. The model was then evaluated; FIG. 2 is a chart 200 that displays the performance comparison with the original version of the model using uncompressed variables. As can be seen, there is nearly perfect correspondence between the two curves. The barely noticeable drop in performance of the compressed version can be removed by doubling the precision of the variables. To achieve this added precision, detailed knowledge of the actual profiles was exploited: in particular, the fact that all but two of the variables are positive allows their representation as an Unsigned Int. The two remaining variables have extremum with absolute value less than one; thus the same level of precision (one in four thousand) was achieved by halving the size of M. The code-snippet below implements these two features (for the signed and unsigned variable cases) and the chart 300 in FIG. 3 displays the resulting performance curves: this time the two models are statistically indistinguishable.

```
// Mapping as an Unsigned Integer
VAR s1DAILY_DOL_AUTH_1D_98S : FLOAT
GRP = VARS
CALC =
VAR
    TMP1 : NUMERIC;
    TMP, ATMP, TMP2, TMPF : UINT16;
    TMPE : INT16;
BEGIN
    TMP := PROF.P207;
    ATMP := ABS(TMP);
    TMPE := TRUNC(ATMP/4000)-8;
    TMP2 := (ATMP-(TMPE+8)*4000)*2.5;
    if(ATMP = 0) THEN TMP1 := 0;
    else    IF(TMPE = 8) THEN TMP1 := 100000000;
            ELSE TMP1 := TMP2/1000.0*POWER(10,TMPE);
    RETURN(TMP1);
ENDVAR;
VAR DAILY_DOL_AUTH_1D_98S : FLOAT
GRP = VARS
RCOD = 8
CALC =
DAILY_RATE(s1DAILY_DOL_AUTH_1D_98S,    IS_AUTH,
DOL_AMT,    A_DR_COEF1_1DAY_98S,
A_DR_COEF2_1DAY_98S);
VAR s2DAILY_DOL_AUTH_1D_98S : FLOAT
GRP = VARS
CALC =
VAR
    TMP, TMP1, ATMP : NUMERIC;
    TMP2, TMPF : UINT16;
    TMPE : INT16;
BEGIN
    TMP := DAILY_DOL_AUTH_1D_98S;
    ATMP := ABS(TMP);
    if(ATMP >0) THEN TMP1 := LOG10(ATMP); ELSE TMP1 := 0;
    if(TMP1 < 0) THEN TMPE := TRUNC(TMP1)-1;
    ELSE TMPE := TRUNC(TMP1);
    TMP2 := ROUND(1000*ATMP/2.5*POWER(10,-TMPE));
    if(TMPE < -8 or ATMP = 0) THEN TMPF := 0;
    ELSE    if(TMPE >= 8) THEN TMPF := 64000;
            else TMPF := ((TMPE + 8)*4000+TMP2);
    PROF.P207 := TMPF;
RETURN(CON_1);
ENDVAR;
// Mapping of Signed Integers at same precision by limiting range of exponent.
VAR s1FPP_TREND_MRCH_COND_TRN_APPR_FRATE_16WK_5E   :   FLOAT GRP =
CROSSSUMM CALC =
VAR
    TMP1 : NUMERIC;
    TMP, ATMP, TMPE, TMP2, TMPF, SIGN : INT16; BEGIN
    TMP := PROF.P18;
    if(TMP < 0) THEN SIGN := -1; ELSE SIGN := 1;
    ATMP := ABS(TMP);
    TMPE := TRUNC(ATMP/4000)-8;
    TMP2 := (ATMP-(TMPE+8)*4000)*2.5;
    if(ATMP = 0) THEN TMP1 := 0;
    else    IF(TMPE = 8) THEN TMP1 := SIGN*1.0;
            ELSE TMP1 := SIGN*TMP2/1000.0*POWER(10,TMPE);
```

```
        RETURN(TMP1);
ENDVAR;
VAR FPP_TREND_MRCH_COND_TRN_APPR_FRATE_16WK_5E  : FLOAT
   **********************************************
       *variable updated with new transaction*
   **********************************************
ENDVAR;
VAR s2FPP_TREND_MRCH_COND_TRN_APPR_FRATE_16WK_5E  :
FLOAT GRP = CROSSSUMM CALC =
VAR
    TMP, TMP1, ATMP : NUMERIC;
    TMPE, TMP2, TMPF, SIGN : INT16;
BEGIN
    TMP := FPP_TREND_MRCH_COND_TRN_APPR_FRATE_16WK_5E;
    ATMP := ABS(TMP);
    if(TMP < 0) THEN SIGN := -1; ELSE SIGN := 1;
    if(ATMP >0) THEN TMP1 := LOG10(ATMP); ELSE TMP1 := 0;
    if(TMP1 < 0) THEN TMPE := TRUNC(TMP1)-1;
    ELSE TMPE := TRUNC(TMP1);
    TMP2 := ROUND(1000*ATMP/2.5*POWER(10,-TMPE));
    if(TMPE < -8 or ATMP = 0) THEN TMPF := 0;
    ELSE   if(TMPE >= 0) THEN TMPF := 64000;
           else TMPF := SIGN*((TMPE + 8)*4000+TMP2);
    PROF.P18 := TMPF;
RETURN(CON_1);
ENDVAR;
```

Aspects of the subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein provides many advantages. For example, by allowing for compressed transaction history profiles, companies that have already deployed extensive and sophisticated fraud detection systems can enrich such profiles without having to change or upgrade their existing systems. In particular, in some implementations, such as that with the Fair Isaac Falcon Fraud Manager/Fraud Predictor, cardholder profile variables can be compressed from four to two bytes of storage without any resulting loss of model performance. Compression of existing variables enable the addition of new data elements (e.g. CHIP and PIN; 3D Secure, etc.), new data feeds for fraud monitoring, and/or account management targets other than payment card fraud.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed is:

1. A method to compress data transaction history profiles, the profiles each comprising a plurality of profile variables, each profile variable comprising a real number, each real number providing a factor for determining whether a proposed data transaction is indicative of fraud, the method being implemented by at least one data processor and comprising:

generating, by at least one data processor, a bit string for each profile variable in the profiles, the bit string characterizing a first value plus a second value, the first value equal to a mantissa for the real number corresponding to the profile variable, the second value equal to a number of orders of magnitude above a minimum required expressed as multiples of the number of orders magnitude required to represent the plurality of real numbers in each the plurality of transaction history profiles divided by a range of bits; and storing, by at least one data processor, the generated bit string as a compressed profile variable within the data transaction history profiles.

2. A method as in claim 1, further comprising determining, by at least one data processor, a sign of a mapped integer characterizing an overall sign of the real number in the profile variable, and wherein the bit string characterizes the sign of the mapped integer.

3. A method as in claim 1, wherein the data transaction is an electronic financial transaction.

4. A method as in claim 1, wherein the electronic financial transaction is a payment card transaction.

5. A method as in claim 4, wherein the payment card transaction is a credit card or a debit card transaction.

6. A method as in claim 4, wherein the data transaction history profile characterizes historical behavioral data of a cardholder.

7. A method as in claim 4, wherein the data transaction history profile characterizes historical transaction data of a merchant accepting a plurality of payment cards.

8. A method as in claim 1, further comprising:
decompressing, by at least one data processor, the compressed profile variable when a data transaction associated with the data transaction history profile is initiated.

9. A method to compress data transaction history profiles, the profiles each comprising a plurality of profile variables, each profile variable comprising a real number, each real number providing a factor for determining whether a proposed data transaction is indicative of fraud, the method being implemented by at least one data processor and comprising:
generating, by at least one data processor, a bit string for each real number, the bit string including a predefined number of bits for an exponent for the real number, a bit characterizing a sign of the exponent, at least one bit characterizing a sign of the real number, and a plurality of bits characterizing a reduced level of precision of the real number; and
storing, by at least one data processor, the bit string as a compressed profile variable within the data transaction history profiles.

10. A method as in claim 9, wherein the data transaction is an electronic financial transaction.

11. A method as in claim 9, wherein the electronic financial transaction is a payment card transaction.

12. A method as in claim 11, wherein the payment card transaction is a credit card or a debit card transaction.

13. A method as in claim 12, wherein the data transaction history profile characterizes historical behavioral data of a cardholder.

14. A method as in claim 12, wherein the data transaction history profile characterizes historical transaction data of a merchant accepting a plurality of payment cards.

15. A method as in claim 9, further comprising:
decompressing, by at least one data processor, the compressed profile variable when a data transaction associated with the data transaction history profile is initiated.

16. A method to compress payment card transaction history profiles, the profiles each comprising a plurality of profile variables, each profile variable comprising a real number, each real number providing a factor for determining whether a proposed payment card transaction is indicative of fraud, the method being implemented by at least one data processor and comprising:
determining, by at least one data processor, a mantissa for each profile variable in the profiles, the mantissa being rounded as units of a number equal to a number of orders of magnitude required to represent the plurality of real numbers in each of the plurality of transaction history profiles divided by a range of bits;
determining, by at least one data processor, an argument for an exponent for each real number;
determining, by at least one data processor, a sign of a mapped integer corresponding to each real number; and
storing, by at least one data processor, each mapped signed integer as a compressed profile variable within the data transaction history profiles.

17. A method as in claim 16, wherein the payment card transaction is a credit card or a debit card transaction.

18. A method as in claim 16 wherein the data transaction history profile characterizes historical behavioral data of a cardholder.

19. A method as in claim 16 wherein the data transaction history profile characterizes historical transaction data of a merchant accepting a plurality of payment cards.

20. A method as in claim 16, further comprising:
decompressing, by at least one data processor, the compressed profile variable when a payment card transaction associated with the payment card history profile is initiated.

* * * * *